E. G. KESLING.
INSCRIPTION MEANS FOR CAMERAS AND METHOD OF PHOTOGRAPHING WRITTEN INSCRIPTIONS.
APPLICATION FILED MAY 22, 1917.

1,276,542.

Patented Aug. 20, 1918.
3 SHEETS—SHEET 2.

WITNESSES
Howard T. Orr.
F. T. Chapman

INVENTOR
Elmer G. Kesling
BY

UNITED STATES PATENT OFFICE.

ELMER G. KESLING, OF BLOOMFIELD, MISSOURI.

INSCRIPTION MEANS FOR CAMERAS AND METHOD OF PHOTOGRAPHING WRITTEN INSCRIPTIONS.

1,276,542.

Specification of Letters Patent.

Patented Aug. 20, 1918.

Application filed May 22, 1917. Serial No. 170,214.

*To all whom it may concern:*

Be it known that I, ELMER G. KESLING, a citizen of the United States, residing at Bloomfield, in the county of Stoddard and State of Missouri, have invented a new and useful Inscription Means for Cameras and Methods of Photographing Written Inscriptions, of which the following is a specification.

This invention has reference to inscription means for cameras, and method of photographing written inscriptions, the object being to light print written inscriptions upon photographically sensitive films for identification or other purposes, whereby the ultimate positive print may contain the inscription as a title or as a means of imparting information with respect to the scene photographed, or as to other data.

It has been proposed to produce inscriptions upon photographs by inscribing a specially prepared backing sheet of a roll film, and then light printing the sensitive emulsion of the film through the backing sheet in proper relation to the portion of the film exposed to a scene or whatever is photographed upon the film. It has also been proposed to produce the inscription independently of the sensitive film and then light print it upon the film by contact.

In accordance with this invention the inscription is produced entirely separate from and independently of the sensitive film, whether forming part of a roll film, such as employed in roll film cameras, or in connection with plates, or film packs, such as are employed in plate cameras. The inscription is so placed with relation to the sensitive film as to be focused thereupon to the desired size and in the desired location on the film, and an exposure is made in the same manner as is done with respect to the photographing of a scene or some object.

The invention contemplates means positioned in the camera for ready access, whereby an inscription appropriate to the subject photographed may be written as by a lead pencil, although the invention is not limited to such particular writing implement. A lead pencil is a convenient writing implement and produces a sufficiently dense mark, especially upon a slightly roughened surface, to be considered, for the purposes of the invention, as opaque to actinic light. The inscription is produced upon a circumscribed area so that the inscription with a surrounding area of but little greater extent is light printed upon a corresponding area of the sensitive surface of the film within the camera and closely adjacent to the portion of the film designed to receive the light image of the ordinary photographic lens of the camera. A focusing means, usually a pin hole opening through an opaque plate, is located between the inscription area and the plane in which the sensitive film is to be located, while suitable means, such as a shutter, is provided for admitting or cutting off the light through the pin hole aperture, and, moreover, corrective means are employed in connection with the pin hole aperture to equalize the effect of the light in order to produce proper illumination throughout the light printed area.

The whole inscription means may form a part of the camera and be wholly, or in most part, contained within the walls of the camera, the arrangement being such that the inscription may be applied without exposing the sensitized film to the action of actinic light, and then a properly focused image of the inscription is projected upon the sensitized film at the will of an operator by means of light reaching the inscription from the exterior of the camera through light correcting and modifying means and transmitted diffusively past the inscription with the light so corrected and modified as to produce an evenly illuminated effect upon the sensitized film over the inscription area.

The invention will be best understood from a consideration of the following detailed description, taken in connection with the accompanying drawings forming part of this specification, with the further understanding that while the drawings show a practical form of the invention, the latter is not confined to any strict conformity with the showing of the drawings, but may be changed and modified, so long as such changes and modifications come within the scope of the appended claims.

Referring first to the showing of Figs. 1 to 6 there is indicated a camera 1 indicating a familiar type of roll film cameras needing no special description. The camera is provided with a door 2, bellows 3 and frame 4 for defining the image area of the camera, and the camera is further assumed to be provided with the usual parts of a roll film camera, which parts, however, are not shown in detail in the drawing, since such showing is unnecessary for an understanding of the invention. Moreover, in Figs. 2 and 5 there is shown a spool 5 for receiving a roll film 6, both the spool and the film being of usual construction, and need no special description. The sensitive surface of the roll film 6 may be assumed to be present at 7, such roll films customarily consisting of a celluloid carrier with a sensitized emulsion on one face and a black paper or other opaque backing adjacent to the other face.

Figure 2:
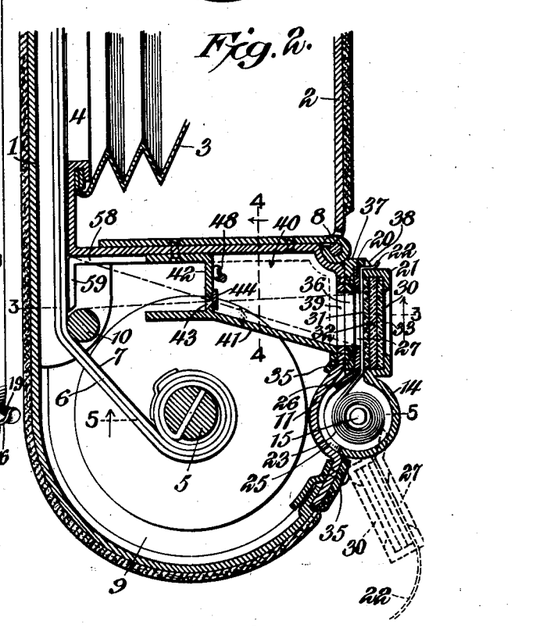
Fig. 2 is a longitudinal section of one end of the camera with the invention applied and drawn on a larger scale than Fig. 1, the roll film with its backing sheet being shown in edge elevation and certain other parts which would be cut by the section being shown in elevation.
Figure 3:
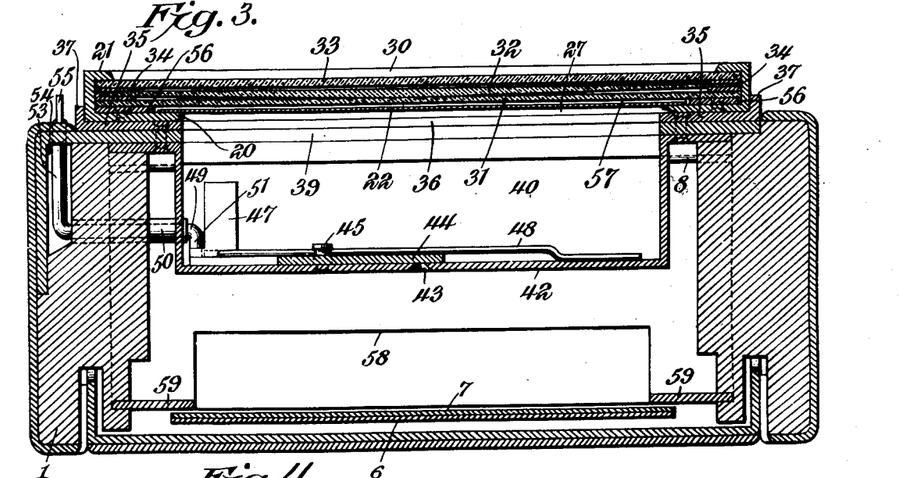
Fig. 3 is a section on the line 3—3 of Fig. 2.
Figure 4:
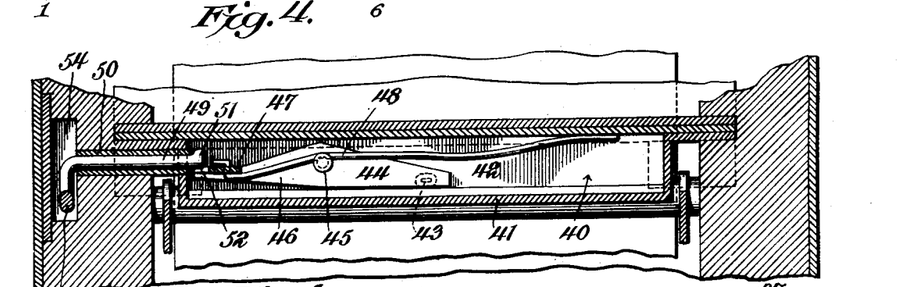
Fig. 4 is a section on the line 4—4 of Fig. 2.
Figure 5:
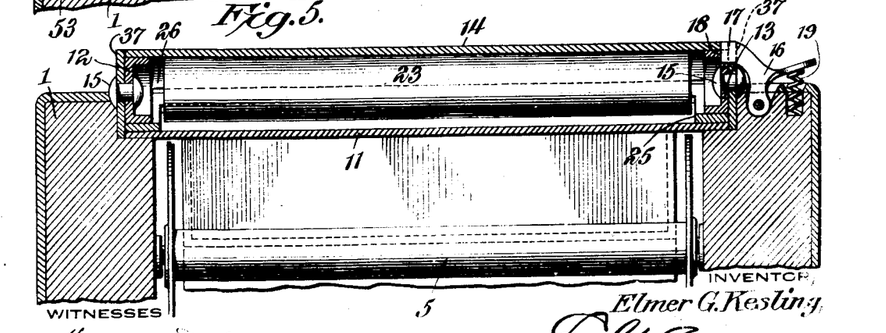
Fig. 5 is a section on the line 5—5 of Fig. 2.

The door 2 is usually connected to the body of the camera by a hinge 8 adjacent to a compartment 9 designed to carry the spool 5, which in the particular showing of the drawings may be considered as the winding spool for the roll film, the latter passing over the customary guide roller 10 before being wound upon the spool 5.

Encroaching to an extent upon the chamber 9 is a curved wall 11 forming a concavity or groove extending crosswise of the front of the camera casing below the hinge 8 if it be considered that the camera is being used in the upright position, that is, with the long side of the image produced by the camera lens upright. The wall 11 forms a seat receiving a casing having heads 12 and 13 and a cylindrical body 14 axially connected to parts to be described by rivets 15 constituting pivot pins or trunnions, so that the casing 14 may be rocked about its longitudinal axis. A catch 16 mounted on the casing of the camera and provided at one end with a nose 17 to engage in a notch 18 in a fixed part of the structure serves to hold the casing 14 in a definite position. The latch 16 is under the normal control of a spring 19 tending to hold the nose 17 in the notch 18.

Projecting in a generally radial direction away from the casing 14 is a wing composed of two substantially parallel parts 20, 21, in close but spaced relation at their adjacent ends, the spacing being such as to accommodate a strip 22 of paper or the like coming from a roll 23 of such paper wound up on itself and housed within the casing 14 and capable of rotation therein. The purpose of the strip 22 will appear hereinafter. One side of the casing 14 is open, as indicated at 25, the opening being of sufficient length in the direction of the length of the casing and of sufficient peripheral extent to permit the introduction of the roll 23 when the casing 14 is unlatched and turned about its axis to bring the opening 25 outermost, since when the casing 14 is in the latched position, the opening 25 is toward the wall 11, and consequently the roll 23 cannot then escape from the casing.

Figure 6:
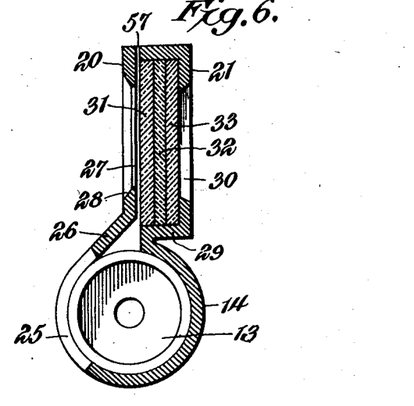
Fig. 6 is a section of a portion of the structure of Fig. 2 drawn on a larger scale.

The parts composing the casing and its wing are best shown in Fig. 6 where the casing 14 is removed from the camera. The part 20 leaves the casing 14 by a short tangential portion 26, and from thence continues in a substantially radial direction for a sufficient distance. In the radial portion of the part 20 there is provided an opening 27 having inclined edges 28 approaching toward the other part 21. The part 20 with its opening 27 therefore forms a frame, the interior of which defines an inscription area, as will hereinafter appear, such inscription area being of a size to admit of the writing of an inscription by means of a pencil upon a suitable writing surface which will also be hereinafter described.

The wing part 21 is so shaped as to provide a box-like receptacle 29 in substantial parallelism with the part 20 and having an open face toward the part 20. Through the other face of the part 21, that is, the face remote from the part 20, is an opening 30 of an area about that of the opening 27, although any exact conformity in areas is not obligatory. Within the box 29 there are lodged three plates 31, 32 and 33 in the particular showing of Figs. 2, 3 and 6. The plates 31 and 33 may be of clear glass. The plate 32 constitutes a correcting, light modifying screen which for purposes that will hereinafter appear is made thicker or denser at the central portion than at the ends. Since it is easier to represent a difference in thickness between the middle portion and end portions of the plate 32 than to represent a difference in density, the graphical representation of the plate 32 is that of a plate thicker in the middle portion than at the ends, but it will be understood that either arrangement may be employed. In any event the variation of the thickness or density and the actual thickness or density are governed by the requirements. Any suitable light transmitting substance may be employed and especially one that reduces the actinic value of the light passing through it. Colored celluloid will answer the purpose, or plain glass properly colored, or simply colored and given the proper modifying thickness to obtain the results desired, may be used. If the end portions of the plate 32 are thinner than the middle portions, then marginal supports 34 are provided to prevent undue strain on the plate. The reasons for the light modifying plate or screen 32 will appear further on.

The wing parts 20 and 21 are in the nature of a door with the casing 14, movable about its longitudinal axis, serving as a hinge at one side of the door, so that the door may be opened and closed as needed.

Fast to the body of the camera adjacent to the hinge 8 of the door 2, is a plate 35 provided with an opening 36 corresponding to the opening 27 and in such position that the opening 27 matches the opening 36 when the door formed of the parts 20 and 21 is closed. The plate 35 has flanges 37 forming a seat for the door made up of the parts 20 and 21, and which door may, for convenience, be termed the inscription door, thus permitting the latter to seat tightly against the corresponding portion of the camera when in the closed position. Certain of the flanges 37 receive the rivets 15 and there may conform to the ends of the casing 14 to produce a neat finish and avoid obtrusive projection of said casing 14. One flange of the flanges 37 is formed with a series of teeth or serrations 38 extending lengthwise of the inscription door in overlapping relation to the space between the two parts 20 and 21 provided for the passage of the strip 22. The serrations 38 serve as a tearing means, whereby portions of the strip 22 may be readily torn off from the main body of the strip as desired. The body of the camera has a passage 39 therethrough conforming with the passage 36. The passages 36 and 39 open into a chamber 40 separated from the chamber 9 by a division wall 41, which latter extends from the opening 36 toward the roller 10, stopping short of the latter. The chamber 40 ends at a septum or diaphragm 42 dividing the chamber 40 from that part of the chamber 9 toward the roller 10, and through the septum 42 there is produced a small aperture 43 of the character known in photography as a pin hole and used after the manner of a lens in so-called pin hole cameras. Normally overlying the pin hole 43 and contained within the chamber 40 and lying against the corresponding face of the septum 42 is a plate 44 serving as a shutter for the pin hole 43. The plate 44 is an elongated plate extending crosswise of the camera and mounted on a pivot pin 45 on which the plate may be rocked. On that end of the plate 44 remote from the end serving as a shutter for the pin hole 43 is an extension 46 provided with an angle tongue 47 bearing against one wall of the camera and serving as a stop or abutment for one end of a spring 48 extending across the pivot pin 45 and toward the other end of the septum 42 where the spring bears against a wall of the chamber 40. The arrangement is such that the spring 48 tends to hold the shutter 44 in closing relation to the pin hole aperture 43. A rock lever 49 is mounted in one side wall of the camera body by means of a guide tube 50, and is provided with an angle end 51 engaging a lug 52 on the plate 44, while at the other end the rock shaft 49 has an angle extension 53 projecting through a slot 54 in the casing 1 at what constitutes the front portion thereof, and sufficiently to provide a finger piece 55 for manipulating the rock lever. In this way an operator has access to the rock lever from the exterior of the camera and may rock the shutter plate 44 to open the aperture 43 to permit light passing through the window portion of the inscription door through the aperture 43 to a portion of the sensitive face 7 of the roll film 6.

Pictures produced in roll film and other cameras are usually rectangles longer in one direction than in the other, while the inscriptions are so located as to appear, when the plate or film is developed, across one end of the picture area just outside of such area. For instance, the inscription area may extend, say, about one-fourth of an inch lengthwise of the film in a roll film camera, and may be as long as the width of the picture area of the film.

Because of the shallow depth of the casing of a roll film camera the field produced by the pin hole opening is restricted and would not ordinarily extend across the film. To remedy this difficulty the pin hole aperture 43 may be elongated in the direction of the width of the camera, thus correspondingly broadening the field, so as to take in the full width of the film or a width corresponding to the inscription area as defined by the opening 27.

A pinhole aperture will give a relatively sharp image even at so short a focus as would be represented by about half the depth of the camera or half the distance between the inscription surface and the sensitive surface 7, the inscription surface being located at or close to the front of the camera and the sensitive surface 7 being located close to the rear of the camera within the casing 1. There is, however, a very marked diminution of intensity of illumination from the middle portion of the image so formed toward the margins, wherefore the light impression upon the sensitized emulsion when strong enough at the central portion of the image fades away to almost no effect at the marginal portions even within the width of the film within the camera. It is to overcome this diminishing of illumination toward the marginal portions that the screen 32 is provided. This screen is made to diminish the actinic value of the light transmitted at the middle portions and to permit a gradual increase of the actinic value of the light toward the margins over the actinic value at the middle portion. By making this correcting screen compensate for the diminishing illumination toward the margins of the field of the pin hole aperture, marked evenness of illumination over the whole effective field is obtained. Since the actual inscription field is long and narrow, the correcting member 32 may also be long and narrow and simply diminish in light retarding value from the center toward the ends, this being found in practice to operate successfully. The correcting of the actinic value may be brought about by the use of color capable of varying actinic values, or by corresponding variations in density or in any way which will accomplish the purpose. If it be considered that the plate or strip 32 is a piece of glass or celluloid, of even color throughout, say, red, then if the strip be diminished in thickness toward the ends, the retarding effect becomes correspondingly lessened. If the strip 32 be simply a piece of darkened glass or celluloid, then the thinning of the strip toward the ends has the same effect of diminishing its retarding value.

The two parts 20 and 21 may be considered as a one piece structure with the plate 31 spaced from the wing 20 by flange supports 56, thus leaving a space such as shown at 57 in Fig. 6 for the passage of the strip 22.

Various materials may be used for the strip 22, such as celluloid, or white paper, or any light transmitting material of suitable quality which will take pencil marks. In the case of celluloid one surface is roughened as by grinding or otherwise, and such roughened surface constitutes a light diffusive surface the same as ground glass or white paper.

When the shutter 44 is closed, which it is under normal circumstances, no light entering the chamber 40 through the inscription door can reach the sensitive film so that then the door may be opened and carried to the position shown in dotted lines in Fig. 2, where it is conveniently located for writing an inscription upon the then exposed surface of the strip or sheet 22. Such inscription is produced usually by means of a pencil as the most convenient writing implement, although any other suitable writing implement capable of depositing a suitable actinically opaque material upon the writing surface may be employed. The sheet or plate 31 serves as a writing table.

Now, the inscription door is closed and is held in the closed position by the latch 16. The operator having directed the opening 30 toward a suitable source of light, such as an open sky, operates the lever 49 to open the pin hole aperture 43, whereupon an image of the inscription is projected upon a proper portion of the roll film between the roller 10 and that portion of the interior structure of the camera carrying the frame 4 defining the image field. As soon as the exposure has been for a sufficient length of time, the shutter is released and preparations may be made for the next exposure in order. It is customary to make an exposure through the ordinary camera lens before the inscription is made, the exposed portion of the film being wound on the receiving spool, and a small section just beyond that directed to the spool then receives the image of the inscription for light printing it on the film.

In order to sharply confine the inscription area on the film an extension 58 of one wall of the chamber 40 is carried toward the path of the roll film 6, and is provided with terminal fingers 59, which together with the extension of the wall 41 and roller 10 mark out with sufficient sharpness the inscription area so that its margins are distinct.

In photographing the inscription upon the film the light on entering the camera first passes through the correcting means, and then through diffusive means to and past the inscription, then through the pin hole aperture or lens, and finally to the sensitive emulsion, these several steps resulting in a light printing of the inscription, appearing in the negative and in the finished print particularly clear cut.

The results obtained are markedly superior to those obtained by the contact printing method, since the effect is similar to that of the photograph lens in the camera, there being no diffusion such as happens when the inscription is removed from the sensitive emulsion by a sensible distance, as occurs when the light after passing the inscription must proceed through an inscription carrier and then through the emulsion carrier before ultimately reaching the emulsion itself.

The image producing method of the invention in projecting an image of the inscription upon the sensitive film for light printing thereon is materially different in results from the contact method heretofore employed, and the extremely small aperture of the pin hole permits great latitude of exposure. For instance, with a certain quality of printing light and using the projecting method of this invention, the time of exposure has been varied from two to forty seconds with the same inscription without injury to the ultimate negative, but with the contact printing method the time has not exceeded from two to five seconds. Moreover, the inscription need not be applied with any particular care, since the resultant picture of the inscription appears more as a silhouette than as a detailed photograph.

Figures 7, 8:
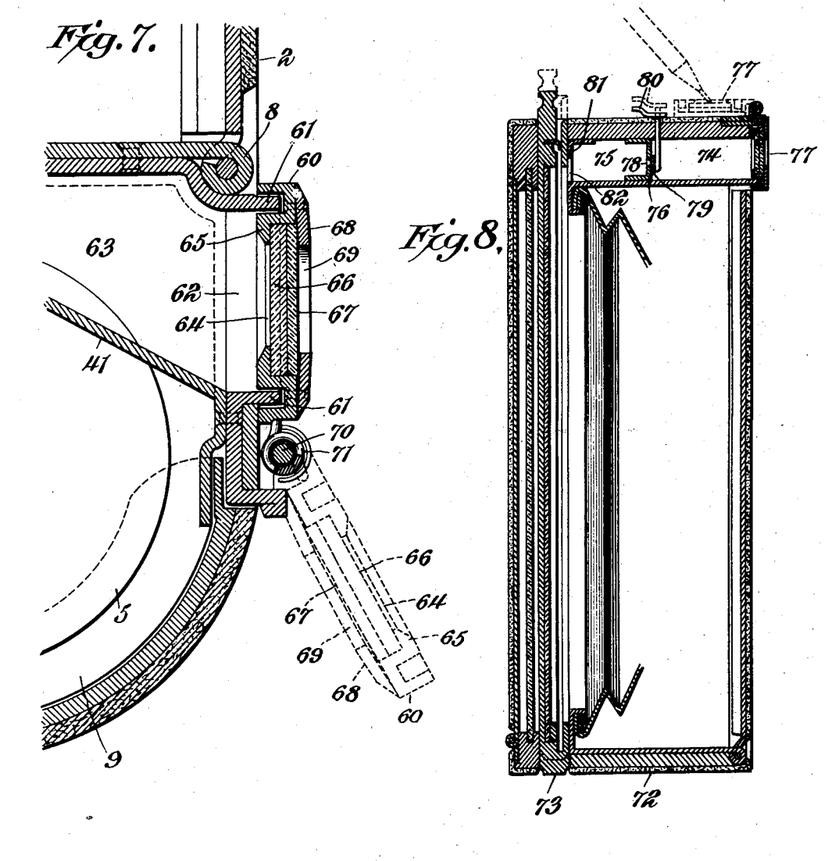
Fig. 7 is a section through a modification of the invention drawn in substantially the plane of Fig. 2 and on a larger scale, the showing of Fig. 7 being limited to the light admitting portion of the inscription part of the camera.
Fig. 8 is a section through a camera of the plate type showing one application of the invention thereto.

As an example of other applications of the invention there is shown in Fig. 7 a different form of inscription receiving door from that shown in the preceding figures. There is provided a door 60 of channel frame form with the channel receiving flanges 61 formed about an opening 62 entering a chamber 63 corresponding to the chamber 40. No showing is made of the pin hole lens and parts associated therewith, since they may be the same as in the preceding figures. The door 60 has an opening 64 matching the opening 62 and defining the inscription area. The opening 64 is formed by inturned flanges or ledges 65 producing a pocket for the reception of plates 66, 67, respectively, and these plates are held in place by a framelike cap 68 applied to the outer face of the door and provided with an aperture 69 corresponding to the passage 64. The door 60 is mounted on a hinge pintle 70 carrying a spring 71 tending to hold the door in the closed position, but permitting it to be opened so as to provide access to that surface of the plate 66 toward the passage 64. The plate 66 has the inscription receiving surface, which is toward the opening 64, of a roughened nature, and considering the plate 66 as of glass the inscription receiving surface may be ground, thus not only providing for writing thereon by a pencil, but producing diffusion of the light entering the chamber 63. The plate 67 may be of a character corresponding to the plate 32, so as to have a gradually varying actinic value to correct the aberrations of the pin hole aperture or lens.

Figure 1:
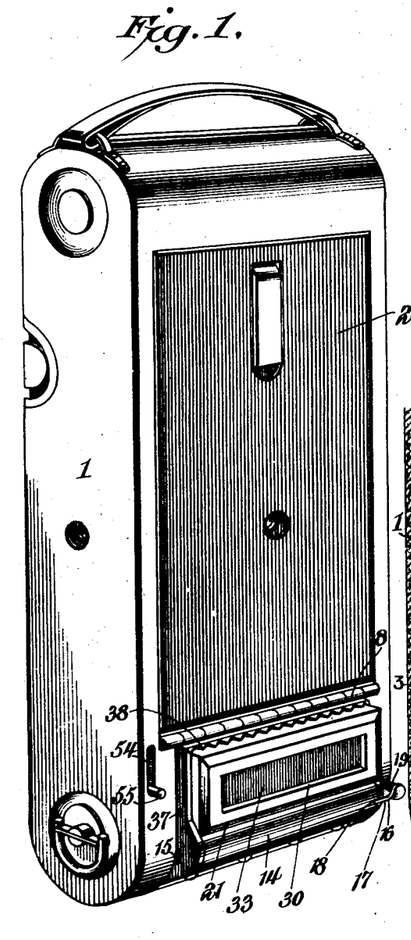
Figure 1 is a perspective view of a roll film camera with the invention embodied therein.

The procedure with the structure of Fig. 7 is the same as in the structure of Fig. 1 and associated figures, and hence needs no further description.

In Fig. 8 the application of the invention to a plate camera is indicated. There is shown a camera box 72 arranged for the reception of a plate holder 73. In what constitutes the top of the box 72 is a compartment made up of two chambers 74, 75 divided by a partition 76. The chamber 74 corresponds to the chamber 40 of Fig. 2, and has a door 77 constituting the inscription receiving door which may be like that of the structure of Fig. 2 or the structure of Fig. 7, the showing corresponding to that of Fig. 7 rather than Fig. 2. The partition 76 has a pin hole aperture 78 normally closed by a shutter 79 under the control of a manipulating member 80 extending to the exterior of the casing. The shutter 79 may be considered as similar to the shutter 44 of preceding figures, and is operated in like manner. A plate 81 with a passage 82 therethrough is located at that end of the chamber 75 remote from the partition 76.

After a plate in the plate holder 73 has been exposed to a lens image in the ordinary working of the camera, the plate holder is lifted a short distance with the dark slide still removed, so that a small portion of the sensitive surface of the plate is opposite the opening 82. An inscription having been placed upon the inscription door in a manner already described, and the door again closed, the shutter 79 is opened, and an image of the inscription is projected upon that portion of the plate in the plate holder opposite the opening 82, thus light printing the inscription in the same manner as described with reference to others of the figures. Finally, the dark slide always provided with plate holders is replaced, and the plate holder with the exposed plate therein is removed in the usual manner for subsequent development, whereupon the developed negative will show the lens image and the inscription image in proper relation.

The same procedure is possible with a film pack, but it is not deemed necessary to illustrate the arrangement since it is to all intents the same as shown in Fig. 8 with reference to a plate camera.

The invention may be applied to commercial forms of cameras already in existence, or the camera may be specially built for the purpose, and for this reason may be slightly longer than cameras as ordinarily constructed to accommodate the inscription space, or the view area of the camera may be correspondingly shortened.

The invention differs from other inscription cameras in that the inscription-receiving structure is placed at the front of the camera, that is, on the same side of the sensitive surface when the film or plate is within the camera as the view lens of the camera, so that the image of the inscription is projected by transmitted light from front to back of the camera directly upon the sensitive surface without the light having to pass through an inscription surface and through the film carrier before reaching the film.

The focusing means is of a fixed focused character and so arranged as to act the same as a very wide angle and very short focus lens, and is usually so positioned that the image projected upon the sensitive film is of the same size as the inscription, although such particular arrangement is not obligatory.

The inscription surface may be ground or etched or may be made of paper or some other similar material, with the inscription receiving surface so positioned when ready for projecting the inscription upon the sensitive surface that the inscription is toward such surface, and the light image of the inscription is directly transmitted to the sensitive surface.

With the invention special provision for dimming the intensity of the light reaching the sensitive surface in light printing the inscription thereon is not necessary, since this is taken care of by the minute aperture of the pin hole focusing means or lens.

When ground glass is used as the inscription receiving surface, it may be repeatedly cleaned for reuse, but with paper or celluloid or the like, fresh surfaces may be provided for each inscription.

While the pin hole focusing means has been found in actual practice to be highly advantageous, this does not preclude the use of a properly constructed lens of light transmitting material.

What is claimed is:—

1. A camera having a view area and an aperture through its front wall to one side of the view area, and a door hinged to the camera and normally covering the aperture and provided on the face toward the interior of the camera with an inscription receiving surface, said door being movable about its hinge axis from the aperture-covering position to an open position, thus exposing the inscription receiving surface for access.

2. A camera having a view area and an aperture through its front wall to one side of the view area, focusing and exposing means within the camera between the aperture and the rear wall of the camera, and a door hinged to the camera and normally covering the aperture and provided on the face toward the interior of the camera with an inscription receiving surface, said door being movable from the aperture-covering position to an open position, thus exposing the inscription receiving surface to access.

3. A camera having a view area and an aperture through its front wall to one side of the view area, focusing and exposing means between the aperture and the rear wall of the camera, and a door normally covering the aperture and provided on the face toward the interior of the camera with an inscription receiving surface, said door being also provided with correcting means for the focusing means and movable to an open position exposing the inscription receiving surface to access.

4. A camera provided with an aperture through its front wall to one side of the view area of the camera, and a door having a portion transmissible of light and normally closing the aperture, said door being provided with a reservoir for containing a supply of inscription receiving material movable from the reservoir across the light transmitting area of the door.

5. A camera having a light transmitting aperture through its front wall to one side of the view area of the camera, and a door hinged to the front wall of the camera and normally closing the aperture, said door having a reservoir for inscription receiving material located at the hinge portion of the door for movement of the inscription receiving material from the reservoir across the aperture.

6. A roll film camera having a view area and an aperture through its front wall to one side of the view area, focusing and exposing means between the front and rear walls of the camera in line with the aperture, and a door hinged to the front wall and normally closing the aperture, said door having light transmitting correcting means for the focusing means, and a reservoir for inscription receiving material located at the hinge portion of the door for movement of the inscription receiving material across the door.

7. A roll film camera having a view area and an aperture through its front wall to one side of the view area, focusing and exposing means between the front and rear walls of the camera in line with the aperture, and a door hinged to the front wall and normally closing the aperture, said door having light transmitting correcting means for the focusing means, and a reservoir for inscription receiving material located at the hinge portion of the door for movement of the inscription receiving material across the door, said door having means for holding and guiding the inscription receiving material when the door is opened for applying the inscription, and when the door is closed for exposing the inscription to light print its image upon a photo sensitive surface within the camera.

8. A camera having an aperture through its front wall to one side of the view area of the camera, means within the camera for projecting an image upon a photo sensitive surface in line with the aperture, and carrying means for an inscription receiving surface located at the front wall of the camera in normally covering relation to the aperture, and movable from such relation to a position exposing the inscription receiving surface to access, and correcting means for the projecting means carried by the aperture covering means.

9. A camera having an aperture through its front wall to one side of the view area, focusing means within the camera in line with the aperture, and a carrier for an inscription receiving surface normally covering the aperture, with the inscription receiving surface toward the rear of the camera, said carrier over the portion covering the aperture being transmissible of light, and said carrier being movable from the aperture closing position to another position exposing the inscription receiving surface to access.

10. A photographic camera provided with an interior focusing means of pin hole type in position to project an image upon a chosen portion of a sensitive surface within the camera adjacent to the image area of the camera, and inscription receiving means provided with correcting means for the pin hole focusing means to compensate for the marginal diminution of light characteristic of pin hole focusing means.

11. A photographic camera provided with an interior pin hole focusing means of short focus and wide angle with respect to its location with reference to a photo sensitive surface within the camera, means for the production and location of an inscription in the camera on the side of the focusing means remote from the sensitive surface for the projection of an image of the inscription upon the sensitive surface on a narrow elongated area thereof, and correcting means for the focusing means to compensate for the characteristic diminution of illumination toward the marginal portions of the image produced by the focusing means.

12. A photographic camera provided with an interior pin hole focusing means of short focus and wide angle with respect to its location with reference to a photo sensitive surface within the camera, means for the production and location of an inscription in the camera on the side of the focusing means remote from the sensitive surface for the projection of an image of the inscription upon the sensitive surface on a narrow elongated area thereof, and correcting means for the focusing means to compensate for the characteristic diminution of illumination toward the marginal portions of the image produced by the focusing means, said correcting means comprising actinic retarding means of diminishing intensity from a portion corresponding to the focal axis of the focusing means toward the marginal portions of the field of said focusing means.

13. Means for the production of light prints of inscriptions upon photo sensitive surfaces within a photographic camera, comprising focusing means of wide angle and short focus within the camera, means for correcting the focusing means to compensate for the characteristic diminution of illumination toward the marginal portions of the image produced by the focusing means, inscription receiving means carried by the camera and arranged to be located in the focal axis of the focusing means for the projection of the image of an applied inscription upon the chosen portion of the photo sensitive surface, and means for admitting the image of the inscription produced by the focusing means to the sensitive surface or shutting it off therefrom, at will.

14. A photographic camera provided with a pin hole focusing aperture within the camera out of the range of the image area of the camera and positioned to produce an image upon a chosen portion of a sensitive surface within the camera adjacent to the image area of the camera, said pin hole aperture being elongated in the direction of the width of the camera to produce a narrow elongated image, a shutter associated with the pin hole aperture, and a door movable from a position in the focal axis of the pin hole aperture to a position bringing a surface directed toward the pin hole aperture when in the focal axis thereof into a position of access exterior to the camera for the application of an inscription by a writing implement, and said door having means for the admission of actinic light therethrough and also correcting means for the pin hole aperture comprising elongated actinic retarding means diminishing in intensity from an intermediate portion toward the ends, whereby to compensate for the diminishing intensity of illumination characteristic of the image produced by a pin hole aperture toward the marginal portions of the image.

15. The method of light printing inscriptions upon a photo sensitive surface in a camera, which consists in producing the inscription upon a surface transmissible of actinic light, causing the transmission within the camera of a light image of the inscription through a pin hole aperture on to the sensitive surface, and at the same time modifying the intensity of the light so transmitted and reaching the sensitive surface in inverse relation to the variation of intensity of a light image between the optical axis and the margins of the field as projected by a pin hole aperture.

16. The method of light printing inscriptions upon a photo sensitive surface in a camera, which consists in producing the inscription in light retarding material upon a light diffusive surface transmissible of actinic light, and causing the transmission within the camera of a light image of the inscription through a pin hole aperture on to the sensitive surface, and at the same time modifying the intensity of the light reaching the sensitive surface in inverse proportion to the intensity of the light transmitted by the pin hole aperture between the optical axis and the margins of the image field.

In testimony that I claim the foregoing as my own I have hereto affixed my signature in the presence of two witnesses.

ELMER G. KESLING.

Witnesses:
 WINY WALKER,
 E. A. MOSELEY.